US008397490B2

(12) United States Patent  (10) Patent No.: US 8,397,490 B2
Shibata et al.  (45) Date of Patent: Mar. 19, 2013

(54) SYSTEM AND METHOD FOR CONTROLLING A CATALYST TEMPERATURE IN AN HCCI COMBUSTION ENGINE

(75) Inventors: Jonathan T. Shibata, Whitmore Lake, MI (US); Allen B. Rayl, Waterford, MI (US); Vijay Ramappan, Novi, MI (US)

(73) Assignee: GM Global Technology Operations LLC

( * ) Notice: Subject to any disclaimer, the term of this patent is extended or adjusted under 35 U.S.C. 154(b) by 372 days.

(21) Appl. No.: 12/507,925

(22) Filed: Jul. 23, 2009

(65) Prior Publication Data

US 2011/0016850 A1   Jan. 27, 2011

(51) Int. Cl.
*F01N 3/00*   (2006.01)
(52) U.S. Cl. .......................................... 60/285; 60/286
(58) Field of Classification Search .................... 60/277, 60/285, 301, 286
See application file for complete search history.

(56) References Cited

U.S. PATENT DOCUMENTS

2002/0194841 A1* 12/2002 Genderen ....................... 60/286
2003/0192305 A1* 10/2003 Iihoshi et al. ................... 60/277
2004/0182359 A1*  9/2004 Stewart et al. ................ 123/295

OTHER PUBLICATIONS

The American Heritage Dictionary of the English Language, 2011, Houghton Mifflin Harcourt, 5th edition, online version.*
The Authoritative Dictionary of IEEE Standards, 2000, Standards Information Network IEEE Press, 7th edition, pp. 703-704.*

* cited by examiner

*Primary Examiner* — Thomas Denion
*Assistant Examiner* — Jason Shanske

(57) ABSTRACT

A method and system for controlling an engine includes a homogenous charge compression ignition (HCCI) mode control module that operates an engine in HCCI mode and a condition monitor module that monitors operating conditions of the engine. The control module also includes a condition predictor module that generates a first predicted condition of a catalyst in response to the operating conditions of the engine. A comparison module compares the first predicted condition to a first threshold. A spark injection mode control module operates the engine in a spark injection mode in response to comparing.

19 Claims, 4 Drawing Sheets

SYSTEM AND METHOD FOR CONTROLLING A CATALYST TEMPERATURE IN AN HCCI COMBUSTION ENGINE

FIELD

The present disclosure relates to engine control systems, and more particularly to engine control systems for controlling the temperature of an exhaust catalyst for an engine operating in both spark ignition and homogenous charge compression ignition (HCCI) modes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engines may be operated in a spark ignition (SI) mode and a homogeneous charge compression ignition (HCCI) mode. The HCCI mode involves compressing a mixture of fuel and an oxidizer to a point of auto-ignition. One of the modes may be selected based on engine speed and load. In the HCCI mode, ignition occurs at several locations at a time, which makes a fuel/air mixture burn nearly simultaneously. The HCCI mode performs close to an ideal Otto cycle, provides improved operating efficiency and generates lower emission levels as compared to SI mode. However since there is no direct initiator of combustion, the ignition process tends to be more difficult to control.

To adjust operation during the HCCI mode, a control system may alter the conditions that induce combustion. For example, the control system may adjust compression ratios, induced gas temperature, induced gas pressure, or the quantity of retained or reinducted exhaust. Several approaches have been used to perform the adjustments and thus extend the HCCI operating region.

One control approach employs variable valve timing to adjust the compression ratio. For example, the compression ratio can be controlled by adjusting when intake valves close. The amount of exhaust gas retained in a combustion chamber can be controlled by valve re-opening and/or valve overlap.

During operation of the engine in HCCI mode, the exhaust gas temperatures are lower than running in a spark-injection mode. The lower exhaust temperatures in an HCCI mode may, for extended periods of time, reduce the catalyst efficiency. When the catalyst temperature drops below a predetermined temperature, the catalyst efficiency may drop below a critical threshold. When the temperature or catalyst efficiency drops below a predetermined threshold, the amount of exhaust gases emitted by the vehicle increases.

SUMMARY

The engine control system according to the present disclosure operates the gasoline engine in the SI mode and the HCCI mode. The HCCI mode is operated in a limited range of operation. However, if the exhaust efficiency or temperature drops below a threshold, the SI mode is used in one or a number of cylinders to increase the temperature of the exhaust gases to increase the catalyst temperature and efficiency.

In one aspect of the disclosure, a method of controlling an engine includes operating an engine in an homogenous charge compression ignition (HCCI) mode, monitoring operating conditions of the engine, generating a first predicted condition of a catalyst in response to the operating conditions of the engine, comparing the first predicted condition to a first threshold and operating the engine in a spark injection mode in response to comparing.

In another aspect of the disclosure, a system for controlling an engine includes a homogenous charge compression ignition (HCCI) mode control module that operates an engine in HCCI mode and a condition monitor module that monitors operating conditions of the engine. The control module also includes a condition predictor module that generates a first predicted condition of a catalyst in response to the operating conditions of the engine. A comparison module compares the first predicted condition to a first threshold. A spark injection mode control module operates the engine in a spark injection mode in response to comparing.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION

Figure 1A:
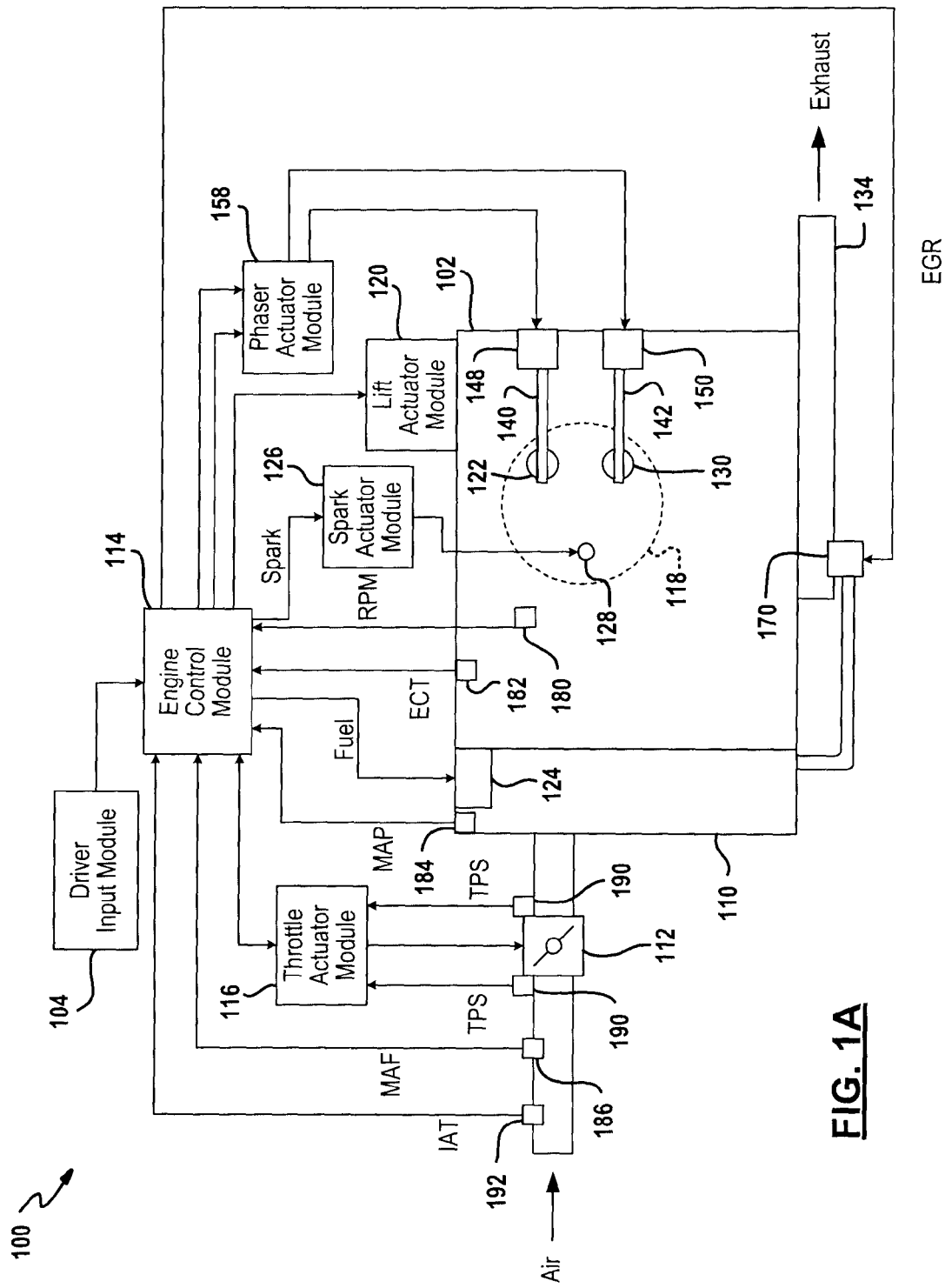
FIG. 1A is a functional block diagram of an engine control system that operates in SI and HCCI combustion modes according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory including one or more software or firmware programs, and/or a combinational logic circuit.

The engine control system according to the present disclosure operates the gasoline engine in the SI mode and the HCCI mode. The HCCI mode reduces fuel consumption but is only available over a limited range of engine torques and speeds. For example only, the engine control system may operate the engine in the HCCI mode at low to mid loads and low to mid engine speeds. The engine control system may operate the engine in the SI mode at other loads and engine speeds. The HCCI operating zones may be defined by operating maps in calibration tables.

Transitions between the SI mode and the HCCI mode should appear seamless to the driver, minimize engine emissions and minimize fuel consumption losses.

The present disclosure monitors the condition of the catalyst such as the catalyst temperature or catalyst efficiency to determine when to switch from an HCCI mode back to an SI mode so that the catalyst efficiency is increased. The present disclosure uses a catalyst temperature model to determine the catalyst temperature or efficiency.

Referring now to FIG. 1A, a functional block diagram of an exemplary engine system 100 is presented. The engine system 100 includes an engine 102 that combusts an air/fuel mixture to produce drive torque for a vehicle based on a driver input module 104. The engine may be a direct ignition engine. Air is drawn into an intake manifold 110 through a throttle valve 112. An engine control module (ECM) 114 commands a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders.

Air from the intake manifold 110 is drawn into the cylinder 118 through an intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders.

The injected fuel mixes with the air and creates the air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114. The lift actuator module 120 adjust the amount of valve lift hydraulically or using other methods.

The engine system 100 may include an exhaust gas recirculation (EGR) valve 170, which selectively redirects exhaust gas back to the intake manifold 110. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186.

The ECM 114 may calculate measured air per cylinder (APC) based on the MAF signal generated by the MAF sensor 186. The ECM 114 may estimate desired APC based on engine operating conditions, operator input or other parameters. The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 114 may use signals from the sensors to make control decisions for the engine system 100.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position.

Similarly, the spark actuator module 126 can be referred to as an actuator, while the corresponding actuator position is amount of spark advance or retard. Other actuators include the EGR valve 170, the phaser actuator module 158, and the fuel injection system 124. The term actuator position with respect to these actuators may correspond to, EGR valve opening, intake and exhaust cam phaser angles, air/fuel ratio, respectively.

Figure 1B:
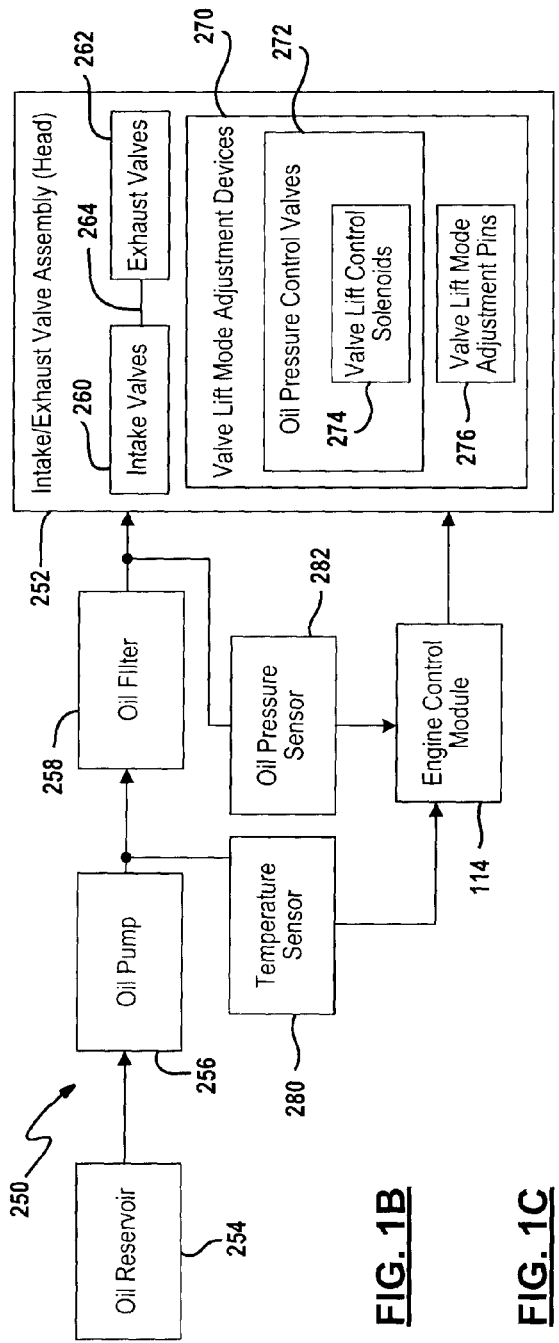
FIG. 1B is a functional block diagram of an exemplary valve lift adjustment system.

Referring now to FIG. 1B, a functional block diagram of a valve lift control circuit 250 is shown. The valve lift control circuit 250 includes an intake/exhaust valve assembly 252 that receives oil from an oil reservoir 254 via an oil pump 256. The oil is filtered through an oil filter 258 prior to reception by the valve assembly 252. The control module controls lift operation of intake and exhaust valves 260, 262 of the valve assembly 252.

The valve assembly 252 includes the intake and exhaust valves 260, 262, which have open and closed states and are actuated via one or more camshafts 264. A dedicated intake camshaft and a dedicated exhaust camshaft may be included. In another embodiment, the intake and exhaust valves 260, 262 share a common camshaft. When in an open state the intake and exhaust valves 260, 262 may be operating in various lift states.

The valve assembly 252 also includes valve lift state adjustment devices 270. The lift state adjustment devices 270 may include oil pressure control valves 272 and valve lift control valves, such as solenoids 274. Other lift state adjustment devices 276, such as lift pins, levers, rockers, springs, locking mechanisms, tappets, etc. may be included.

The valve lift control circuit 250 may include an oil temperature sensor 280 and/or an oil pressure sensor 282. The control module signals the oil pressure control valves 272 based on temperature and pressure signals received from the temperature and pressure sensors 280, 282.

Figure 1C:
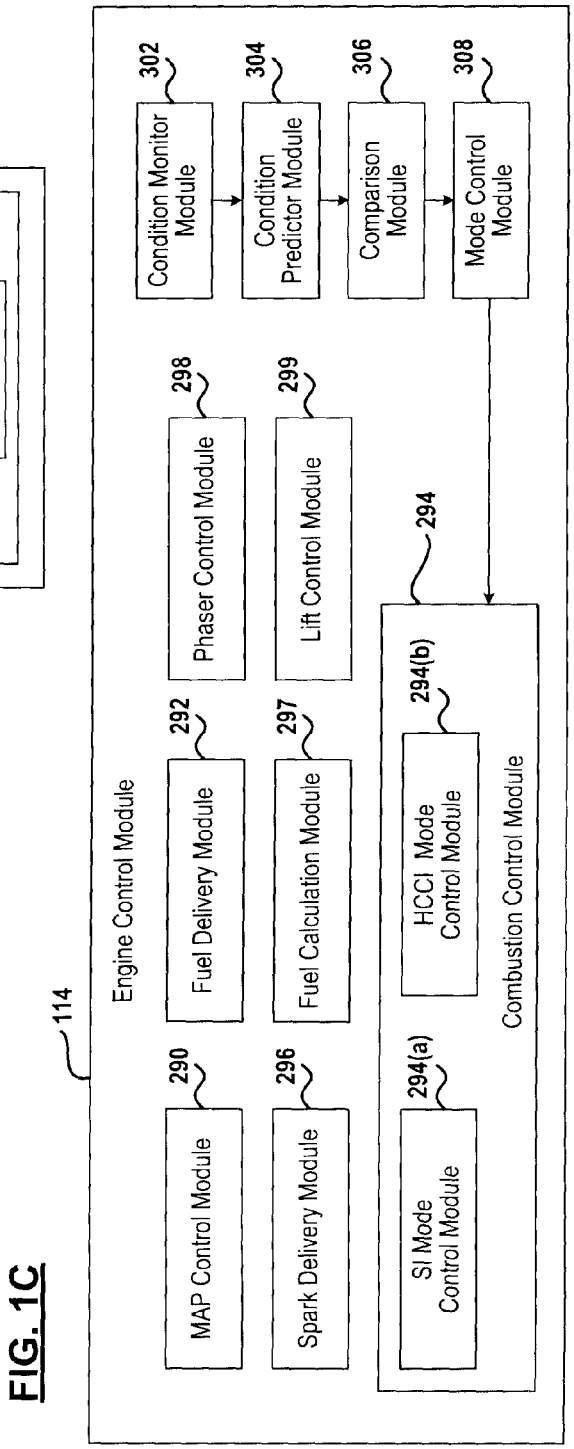
FIG. 1C is a functional block diagram of an exemplary engine control module.

Referring now to FIG. 1C, the engine control module 114 may comprise a map control module 290 having a MAP control mode (MM). The MM can be set to SI and HCCI modes. The engine control module 114 comprises a fuel delivery module 292 having a fuel delivery mode (FM). The fuel delivery module 292 may switch the FM between SI, stratified and HCCI modes. The fuel delivery module 292 may determine the manner, timing and/or amount of fuel delivery.

The engine control module 114 comprises a combustion control module 294 having a combustion mode (CM). The combustion module 294 may switch the CM between SI, HCCI and pre-HCCI modes and include an SI control module 294(*a*) and an HCCI control module 294(*b*).

The engine control module 114 comprises a spark delivery module 296 having a spark delivery mode (SM). The spark delivery module 296 may switch the SM between SI, SI with retard, stratified and HCCI modes. The spark delivery module 296 may determine the timing and duration of spark.

The engine control module 114 comprises a fuel calculation module 297 having a fuel calculation mode (FC). The fuel calculation module 297 may switch the FC between air lead and fuel lead modes. In air lead mode, fuel is controlled based on measured or estimated cylinder air charge or flow. In fuel lead mode, air is controlled based on the measured or delivered fuel.

The engine control module 114 comprises a phaser control module 298 having a phaser control mode (PM). The phaser control module 298 may switch the PM between SI and HCCI modes. The phaser control module 298 may determine cam phasing.

The engine control module 144 comprises a lift control module 299 having a lift control mode (LM). The lift control module 299 may switch the LM between high and low valve lift modes. The disclosure is not limited to high or low lift modes.

The engine control module 114 may include a condition monitor module 302. The condition monitor module may monitor various conditions of the vehicle including the fueling, temperature and air conditions. For example, the condition monitor module may monitor the manifold absolute pressure, the fuel from the fuel delivery and the like.

A condition predictor module 304 predicts conditions within the cylinders based upon the conditions from the condition monitor module 302. The condition predictor module generates a predicted condition of the catalyst in response to the operating conditions of the engine. The predicted condition of the catalyst may correspond to a temperature of the catalyst or the catalyst efficiency. The condition predictor module 304 may operate both in an HCCI mode and in an SI mode.

A comparison module 306 generates a comparison of the catalyst with a threshold. Various thresholds may be compared in the comparison module 306. For example, a comparison may be performed between a first predicted condition of the catalyst operating in HCCI mode to determine whether the efficiency or temperature of the catalyst has dropped to a point that the SI mode is to be operated to increase the temperature of the catalyst. Likewise, when operating in an SI mode just after an HCCI mode, the condition of the catalyst may be compared to a threshold to switch back to the HCCI mode when the catalyst efficiency increases beyond a predetermined temperature or efficiency.

A mode control module 308 controls the mode of the engine based upon the comparison performed in the comparison module 306. The mode control module 308 may change the engine operation from an SI mode to an HCCI mode.

Figure 2:
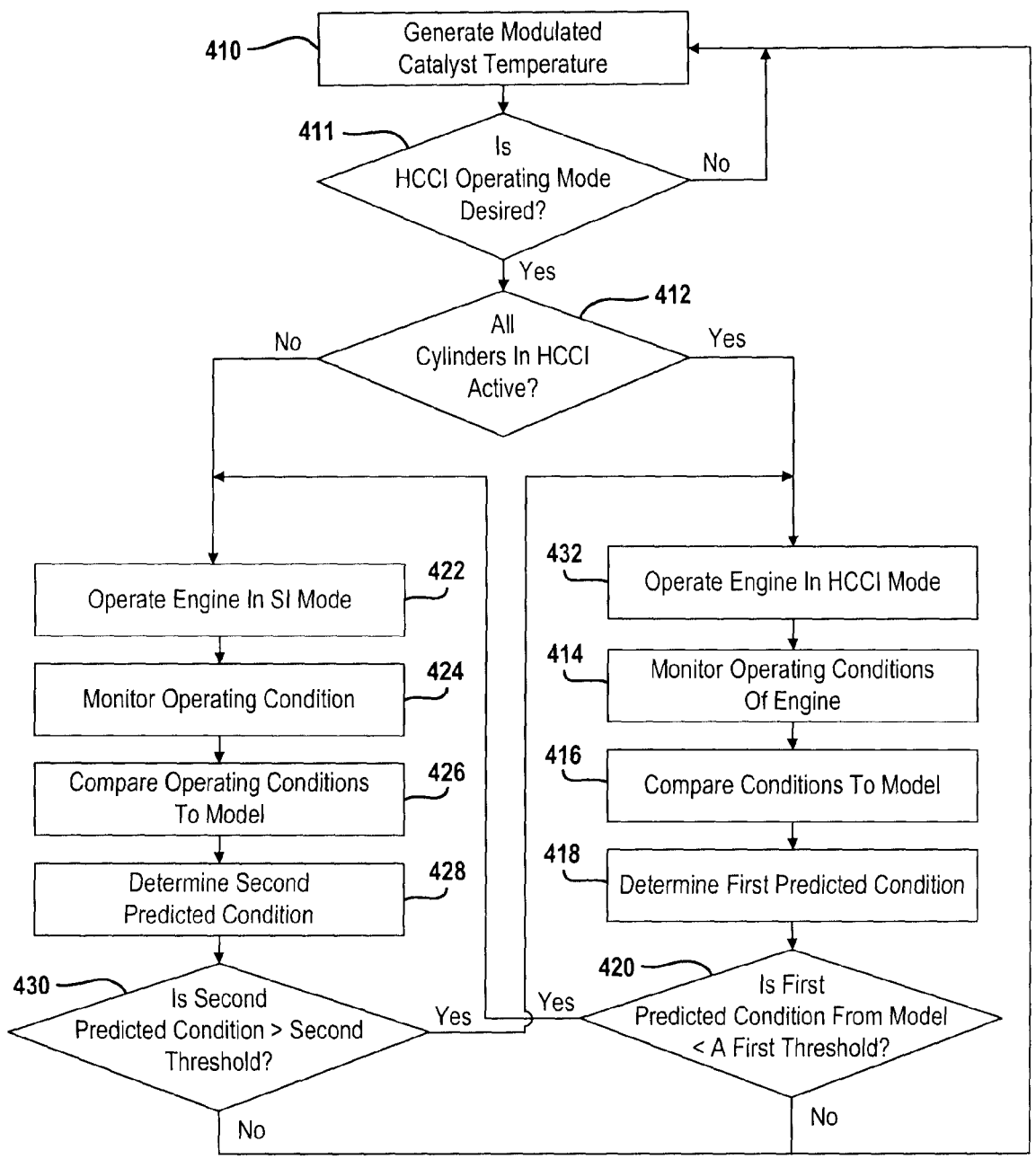
FIG. 2 is a flowchart of a method of switching between an HCCI mode and an SI mode and back according to the present disclosure.

Referring now to FIG. 2, a method of switching between an HCCI mode and an SI mode based upon monitoring the catalyst condition is set forth. In step 410, a catalyst temperature model is generated. The catalyst temperature model may be used to predict the catalyst conditions based upon operating conditions of the vehicle. The catalyst temperature model may be generated during engine development based upon the catalyst and engine operating conditions. Various conditions may affect the catalyst, including the spark and fuel provided to the engine. The catalyst model will likely vary between various engine and catalyst combinations. The catalyst temperature model may vary over various operating conditions of the vehicle as well. Load and engine speed will also affect the catalyst model.

In step 411, if HCCI mode is not desired, step 410 is again performed. When HCCI mode is desired, step 412 is performed.

In step 412, it is determined whether the engine is operating in all cylinder HCCI mode. The present disclosure is applicable to engines operating in an HCCI mode to determine whether to switch into an SI mode. In step 412, when the engine is operating in an HCCI mode in step 432, step 414 monitors the operating conditions of the engine. Load, engine speed, torque and other conditions may be monitored. In step 416, a comparison is performed between the operating conditions and the model of step 410. In step 418, a first predicted condition of the catalyst is determined. As mentioned above, the first predicted condition may correspond to a catalyst temperature, a catalyst efficiency or other catalyst condition.

In this example, the first predicted condition is determined and compared to a first threshold. When the first condition is not less than the first threshold, step 410 is again performed. When the first predicted condition is less than a first threshold, step 422 is performed. The comparison performed in step 420 is an indicator that the catalyst is not operating at a desired efficiency above which the output of the catalyst is acceptable. In step 422, the engine switches to an SI mode to increase the temperature of the catalyst. Step 422 is also performed when all the cylinders are not in HCCI mode in step 412. In step 424, the operating conditions of the vehicle are monitored. It should be noted that steps 414 and 424 both correspond to monitoring operating conditions of the engine. The monitoring conditions of the engine may be continually monitored.

In step 426, the operating conditions are compared to the model. In step 428, the second predicted condition of the catalyst is determined. In step 430, the second predicted condition is compared to a second threshold. The second threshold corresponds to a level for switching back to an HCCI mode when the catalyst efficiency or temperature has risen sufficiently to produce acceptable exhaust gas temperatures. In step 430, when the second predicted condition is not greater than the second threshold, steps 410, 4111, and 422 are again performed and the engine continues to operate in the SI mode. By performing step 422 again, the engine continues to operate in SI mode.

In step 432, the engine is operated in an HCCI mode to increase the fuel efficiency of the vehicle. The system may perform the process from step 412 continuously.

Figure 3:
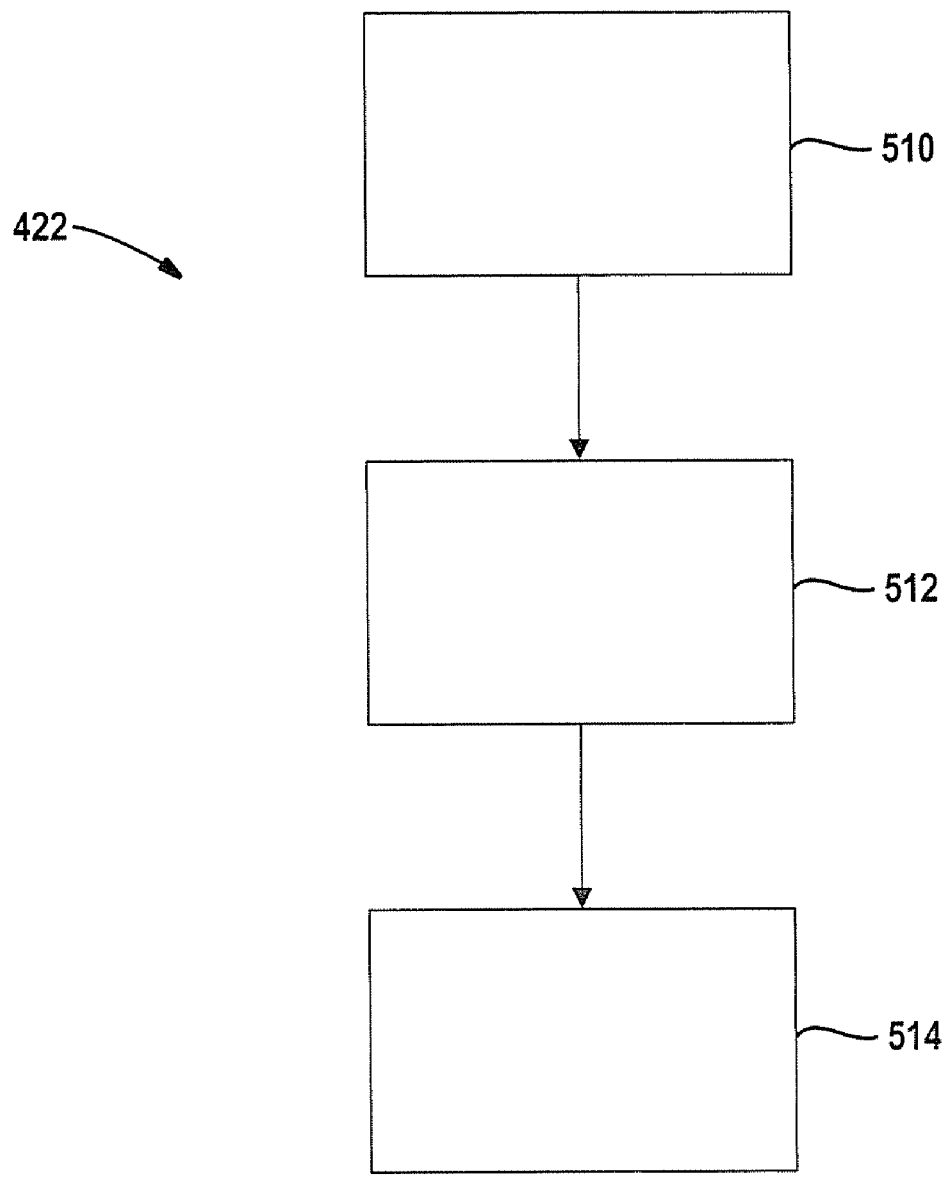
FIG. 3 is a flowchart for controlling the operation of SI mode after an HCCI mode.

Referring now to FIG. 3, step 422 of FIG. 2 is set forth in further detail. In step 422, the engine operates in an SI mode. SI mode is entered from the HCCI mode in step 510. This SI mode is an SI mode performed after the HCCI mode and not the normal operating conditions of the vehicle. In step 512, the engine may operate in SI mode using a predetermined number of cylinders while other cylinders remain in an HCCI mode. That is, one or more cylinders may be operated in SI mode while the other cylinders may operate in an HCCI mode. For example, one or two cylinders may be operated in SI mode while the remaining cylinders may operate in an HCCI mode.

In step 514, the operating pattern of the cylinders in SI mode may be changed while maintaining the other cylinders in an HCCI mode. In step 514, the operating pattern of the cylinders in SI mode may be changed or rotated so that catalyst efficiency or catalyst temperature is increased to a certain temperature. The pattern may change using various numbers of cylinders in SI mode, while the remaining cylinders are operated in the HCCI mode. Various patterns and numbers of cylinders may be performed depending upon the catalyst efficiency. As the catalyst efficiency increases, the number of cylinders operating in an HCCI mode may be increased until the HCCI mode is fully operational.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method of controlling an engine comprising:
operating an engine in a homogenous charge compression ignition (HCCI) mode, wherein the engine includes N cylinders, wherein N is an integer greater than one;
monitoring operating conditions of the engine;
generating a first predicted condition of a catalyst in response to the operating conditions of the engine;
comparing the first predicted condition to a first threshold;
operating M of the N cylinders of the engine in a spark ignition mode in response to comparing while operating a remainder of the N cylinders in the HCCI mode, wherein M is an integer less than N;
forming first and second operating patterns with the M of the N cylinders operating in the spark ignition mode and the remainder of the cylinders operating in the HCCI mode, wherein the first pattern is different than the second pattern; and
controlling a cylinder firing order of the engine according to the first operating pattern, and thereafter controlling the cylinder firing order of the engine according to the second operating pattern.

2. The method as recited in claim 1 further comprising:
generating a second predicted condition of the catalyst in response to the operating conditions of the engine;
comparing the second predicted condition to a second threshold; and
operating the N cylinders of the engine in the HCCI mode in response to comparing the second predicted condition to the second threshold.

3. The method as recited in claim 2 wherein comparing the second predicted condition to a second threshold comprises comparing the second predicted condition to a second threshold equal to the first threshold.

4. The method as recited in claim 2 wherein comparing the second predicted condition to a second threshold comprises comparing the second predicted condition to a second threshold different than the first threshold.

5. The method as recited in claim 2 wherein operating the N cylinders of the engine in the HCCI mode in response to comparing the second predicted condition to the second threshold comprises operating the N cylinders of the engine in the HCCI mode when the second predicted condition is greater than the second threshold.

6. The method as recited in claim 5 wherein the second predicted condition comprises one of catalyst efficiency and catalyst temperature.

7. The method as recited in claim 1 wherein generating a first predicted condition comprises generating a catalyst temperature.

8. The method as recited in claim 1 wherein generating a first predicted condition comprises generating a catalyst efficiency.

9. The method as recited in claim 1 wherein generating a first predicted condition of a catalyst in response to the operating conditions of the engine comprises generating the first predicted condition of the catalyst in response to the operating conditions of the engine and a catalyst model.

10. The method as recited in claim 1 wherein operating the M cylinders of the engine in a spark ignition mode in response to comparing comprises operating the M cylinders of the engine in spark ignition mode when the first predicted condition is below the first threshold.

11. A control system comprising:
a homogenous charge compression ignition (HCCI) mode control module that operates an engine in HCCI mode, wherein the engine includes N cylinders, wherein N is an integer greater than one;
a condition monitor module that monitors operating conditions of the engine;
a condition predictor module that generates a first predicted condition of a catalyst in response to the operating conditions of the engine;
a comparison module that compares the first predicted condition to a first threshold; and
a spark ignition mode control module that operates M of the N cylinders of the engine in a spark ignition mode in response to comparing while operating a remainder of the N cylinders of the engine in the HCCI mode, wherein M is an integer less than N,
wherein the spark ignition mode control module and the HCCI mode control module form first and second operating patterns with the M of the N cylinders operating in the spark ignition mode and the remainder of the cylinders operating in the HCCI mode, respectively, wherein the first operating pattern is different than the second operating pattern, and wherein the spark ignition mode control module and the HCCI mode control module collectively control a cylinder firing order of the engine according to the first operating pattern, and thereafter control the cylinder firing order of the engine according to the second operating pattern.

12. The control system as recited in claim 11 wherein the condition predictor module generates a second predicted condition of the catalyst in response to the operating conditions of the engine, wherein the comparison module compares the second predicted condition to a second threshold and wherein the HCCI mode control module operates the engine in the HCCI mode in response to comparing the second predicted condition to the second threshold.

13. The control system as recited in claim 12 wherein the second predicted condition comprises one of catalyst efficiency and catalyst temperature.

14. The control system as recited in claim 12 wherein the HCCI mode control module operates the N cylinders of the engine in the HCCI mode when the second predicted condition is greater than the second threshold.

15. The control system as recited in claim 11 wherein the spark ignition mode control module operates the M of the N cylinders of the engine in the spark ignition mode when the first predicted condition is below the first threshold.

16. A method for controlling a homogeneous charge compression ignition (HCCI) engine, the method comprising:
operating each of N cylinders of the HCCI engine in an HCCI combustion mode, wherein N is an integer greater than one;
predicting a first temperature of a catalyst using a catalyst temperature model, wherein the catalyst is located in an exhaust system associated with the HCCI engine;
commanding one of the N cylinders of the HCCI engine to operate in a spark ignition (SI) combustion mode when the first temperature is less than a first predetermined temperature and maintaining operation of the (N-1) cylinders of the HCCI engine in the HCCI combustion mode;
predicting a second temperature of the catalyst using the catalyst temperature model;
commanding another one of the N cylinders of the HCCI engine to operate in the SI combustion mode when the second temperature is less than the first predetermined temperature and maintaining operation of the (N-2) cylinders of the HCCI engine in the HCCI combustion mode;
forming first and second operating patterns with any cylinders operating in the spark ignition mode and a remainder of the N cylinders operating in the HCCI mode, wherein the first pattern is different than the second pattern; and
controlling a cylinder firing order of the engine according to the first operating pattern, and thereafter controlling the cylinder firing order of the engine according to the second operating pattern.

17. The method of claim 16, further comprising retarding spark advance for each cylinder operating in the SI combustion mode.

18. The method of claim 16, wherein the first predetermined temperature indicates a minimum catalyst temperature at which emissions output of the catalyst is acceptable.

19. The method of claim 16, further comprising:
commanding one or more cylinders operating in the SI combustion mode to operate in the HCCI combustion mode when the second predicted temperature is greater than a second predetermined temperature, wherein the second predetermined temperature is greater than the first predetermined temperature.

* * * * *